United States Patent
Lee et al.

(10) Patent No.: US 12,129,592 B2
(45) Date of Patent: Oct. 29, 2024

(54) LAUNDRY TREATING APPARATUS

(71) Applicant: LG Electronics Inc., Seoul (KR)

(72) Inventors: Youngjae Lee, Seoul (KR); Kichul Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 818 days.

(21) Appl. No.: 17/179,761

(22) Filed: Feb. 19, 2021

(65) Prior Publication Data

US 2021/0262150 A1    Aug. 26, 2021

(30) Foreign Application Priority Data

Feb. 21, 2020  (KR) .................. 10-2020-0021695

(51) Int. Cl.
| | |
|---|---|
| *D06F 58/24* | (2006.01) |
| *D06F 58/02* | (2006.01) |
| *F04D 29/00* | (2006.01) |
| *F28G 9/00* | (2006.01) |

(52) U.S. Cl.
CPC ............. *D06F 58/24* (2013.01); *D06F 58/02* (2013.01); *F04D 29/007* (2013.01); *F28G 9/00* (2013.01)

(58) Field of Classification Search
CPC .......... D06F 58/24; D06F 58/02; D06F 58/22; D06F 58/206; D06F 39/085; D06F 37/263; D06F 39/04; D06F 58/263; F04D 29/007; F28G 9/00; Y02B 40/00
USPC ......................................................... 34/603
See application file for complete search history.

(56) References Cited

U.S. PATENT DOCUMENTS

| | | | |
|---|---|---|---|
| 2016/0083894 A1* | 3/2016 | Bison ...................... | D06F 58/22 |
| | | | 34/85 |
| 2018/0245271 A1* | 8/2018 | Bocchino ................ | D06F 58/22 |
| 2018/0245272 A1* | 8/2018 | Bocchino ................ | D06F 58/22 |
| 2019/0024299 A1* | 1/2019 | Ryu ........................ | D06F 58/22 |

FOREIGN PATENT DOCUMENTS

| | | |
|---|---|---|
| EP | 2708639 | 3/2014 |
| KR | 10-2013-0060654 | 10/2009 |
| KR | 10-2011-0059993 | 6/2011 |
| KR | 10-2009-0112184 | 6/2013 |

OTHER PUBLICATIONS

Extended European Search Report in European Appln. No. 21156271.5, dated Jul. 1, 2021, 11 pages.
Office Action in Korean Appln. No. 10-2023-0043701, mailed on Dec. 23, 2023, 10 pages (with English translation).

* cited by examiner

*Primary Examiner* — John P McCormack
(74) *Attorney, Agent, or Firm* — Fish & Richardson P.C.

(57) ABSTRACT

A laundry treating apparatus includes a duct system including an air discharge duct for discharging air inside the drum to an outside of the drum, an air supply duct for supplying air to the drum, and a connection duct for connecting the air discharge duct and the air supply duct to each other. The apparatus also includes a heat-absorber disposed inside the connection duct to remove moisture from air, and a heat-emitter disposed inside the connection duct to heat air passing through the heat-absorber. The apparatus further includes a water ejector disposed in the duct system and defining a water flow path for supplying water to the heat-absorber to remove foreign substances remaining on the heat-absorber.

20 Claims, 4 Drawing Sheets

LAUNDRY TREATING APPARATUS

CROSS-REFERENCE TO RELATED APPLICATION

This application claims the benefit of Korean Patent Application No. 10-2020-0021695, filed on Feb. 21, 2020, which is hereby incorporated by reference as when fully set forth herein.

TECHNICAL FIELD

The present disclosure relates to a laundry treating apparatus.

BACKGROUND

A laundry treating apparatus is a generic term for an apparatus for washing laundry, an apparatus for drying laundry, and an apparatus capable of washing and drying laundry.

A conventional laundry treating apparatus capable of drying laundry includes a drum that provides a space for storing laundry therein, a duct defining a water flow path that resupplies air discharged from the drum back to the drum, a first heat-exchanger that removes moisture contained in the air by cooling the air flowing from the drum to the duct, a second heat-exchanger that heats the air that has passed through the first heat-exchanger, and a fan that moves air passing through the second heat-exchanger to the drum.

In the conventional laundry treating apparatus having the above structure, the air discharged from the drum is dehumidified and heated while passing through the heat-exchangers, and the dehumidified and heated air is resupplied to the drum. Thus, foreign substances such as lint may remain in the heat-exchangers. In order to solve this problem, a conventional laundry treating apparatus includes a filter for filtering air supplied to the first heat-exchanger or includes a nozzle for spraying water to the heat-exchanger (EP2691567B1).

The conventional laundry treating apparatus that sprays water to remove foreign substances from the filter or the heat-exchanger generally uses water (condensate) discharged from the air passing through the first heat-exchanger during drying of the laundry. The manner of cleaning the heat-exchanger using the condensate requires a nozzle that sprays the condensate to the first heat-exchanger and a pump that supplies the condensate to the nozzle.

The pump disposed in the conventional laundry treating apparatus includes a pump housing, an impeller rotatably disposed inside the pump housing, a motor that rotates the impeller, a water flow path that supplies the condensate to the pump housing, and a water flow path which guides the condensate inside the pump housing to the nozzle when the impeller rotates.

The laundry treating apparatus having the above structure had a problem in that condensate remains inside the pump housing. In other words, since the impeller must be disposed rotatably inside the pump housing, the impeller and a bottom face of the pump housing must be kept spaced from each other. Therefore, the conventional pump has a problem in that it is difficult to prevent the condensate from remaining inside the pump housing due to a structure of the pump.

SUMMARY

A purpose of the present disclosure is to provide a laundry treating apparatus capable of preventing water from remaining in a housing of a pump that supplies water to a water flow path for cleaning a heat-exchanger.

Further, a purpose of the present disclosure is to provide a laundry treating apparatus capable of both cleaning the heat-exchanger and discharging water discharged from air passing through the heat-exchanger, using a single pump.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

One aspect of the present disclosure provides a laundry treating apparatus comprising: a cabinet; a drum disposed inside the cabinet, wherein the drum has an inner space for receiving laundry therein; a duct system for discharging air in the drum and resupplying air into the drum; a fan for moving air inside the drum along the duct system; a heat-exchanger disposed inside the duct system to remove moisture from air, and to heat air free of moisture; a water collector for storing therein water removed from air passing through the heat-absorber; an water ejector disposed in the duct system to supply water to the heat-exchanger to remove foreign substances remaining thereon; a water flow-path controller including a controller housing has an inner space for storing water therein, a water supply pipe for supplying water into the controller housing, a water discharge pipe for discharging water inside the controller housing, and a valve constructed to control opening and closing of the water discharge pipe; and a pump including a pump housing having an inner space for storing water therein, a first connection pipe for guiding water inside the water collector to the pump housing, a second connection pipe for guiding water inside the pump housing to the water ejector, a third connection pipe for guiding water inside the pump housing to the water supply pipe, an impeller rotatably disposed inside the pump housing, and an impeller driver for rotating the impeller.

Another aspect of the present disclosure provides a laundry treating apparatus comprising: a cabinet; a drum disposed inside the cabinet, wherein the drum has an inner space for receiving laundry therein; a duct system including an air discharge duct for discharging air inside the drum to an outside of the drum, an air supply duct for supplying air to the drum, and a connection duct for connecting the air discharge duct and the air supply duct to each other; a fan for moving air inside the drum along the duct system; a heat-exchanger including a heat-absorber disposed inside the connection duct to remove moisture from air, and a heat-emitter disposed inside the connection duct to heat air passing through the heat-absorber; a water collector for storing therein water removed from air passing through the heat-absorber; an water ejector disposed in the duct system and defining a water flow path for suppling water to the heat-absorber to remove foreign substances remaining on the heat-absorber; a water flow-path controller including a controller housing has an inner space for storing water therein, a water supply pipe for supplying water into the controller housing, a water discharge pipe for discharging water inside the controller housing, and a valve constructed to control opening and closing of the water discharge pipe; and a pump including a pump housing having an inner space for storing water therein, a first connection pipe for guiding water inside the water collector to the pump housing, a second connection pipe for guiding water inside the pump housing to the water ejector, a third connection pipe for guiding water inside the pump housing to the water supply pipe, an impeller rotatably disposed inside the pump housing, and an impeller driver for rotating the impeller.

In one implementation, the apparatus further comprises a discharge hole extending through a bottom face of the pump housing, wherein one end of the third connection pipe is connected to the discharge hole.

In one implementation, the valve includes: a valve body disposed pivotally inside the controller housing to divide an space of the controller housing into a first space communicating with the water supply pipe and a second space communicating with the water discharge pipe; a valve body through-hole extending through the valve body to open the water discharge pipe based on a pivoting angle of the valve body; and a valve body driver for activating a pivoting motion of the valve body.

In one implementation, the apparatus further comprises a water flow-path switch, wherein the water flow-path switch includes: a switch housing having an inner space for water storage therein; a switch inlet for introducing water supplied from the second connection pipe into the switch housing; an water ejector supply pipe for guiding water inside the switch housing to the water ejector; a discharger supply pipe for guiding water inside the switch housing to the water discharge pipe; and a switch valve for controlling opening and closing of the water ejector supply pipe and opening and closing of the discharger supply pipe.

In one implementation, the switch valve includes: a switch body disposed pivotally inside the switch housing, wherein the switch body divides an inner space of the switch housing into a first space communicating with the switch inlet and a second space communicating with the water ejector supply pipe and the discharger supply pipe; a switch body through-hole extending through the switch body to selectively open the water ejector supply pipe and the discharger supply pipe based on a pivoting angle of the switch body; and a switch body driver for activating a pivoting motion of the switch body.

In one implementation, a bottom end of the water discharge pipe is positioned at a level lower than a level of a bottom end of the water supply pipe.

In one implementation, the water discharge pipe is inclined downwards as the pipe extends in a direction away from the controller housing.

In one implementation, the controller housing is positioned at a lower level than a level of the pump housing.

In one implementation, the apparatus further comprises: a first through-hole extending through a rear face of the cabinet, wherein the water discharge pipe is inserted into the first through-hole; and a communication pipe disposed at the water discharge pipe, wherein the water discharger supply pipe is connected to the communication pipe, wherein the communication pipe extends in a perpendicular manner to the water discharge pipe along a height direction of the cabinet.

In one implementation, the apparatus further comprises: a first through-hole extending through a rear face of the cabinet, wherein the water discharge pipe is inserted into the first through-hole; and a second through-hole extending through a rear face of the cabinet, wherein the water supply pipe is inserted into the second through-hole; and a communication pipe disposed at the water discharge pipe, wherein the water discharger supply pipe is connected to the communication pipe, wherein the communication pipe extends in a perpendicular manner to the water supply pipe along a height direction of the cabinet, and is located inside the cabinet.

In one implementation, the water discharge pipe and the water supply pipe extend in a parallel manner to each other.

In one implementation, when the switch body pivots so that the water ejector supply pipe is open and the water discharger supply pipe is closed, the valve body driver activates a pivoting motion of the valve body such that the water discharge pipe is kept in a closed state.

In one implementation, when the switch body pivots so that the water ejector supply pipe is closed and the water discharger supply pipe is open, the valve body driver activates a pivoting motion of the valve body such that the water discharge pipe is kept in a closed state.

In one implementation, when operations of the heat-exchanger and the impeller driver are terminated, the valve body driver activates a pivoting motion of the valve body such that the water discharge pipe is kept in an open state.

The present disclosure may realize the laundry treating apparatus capable of preventing water from remaining in the housing of the pump that supplies water to the water flow path for cleaning the heat-exchanger.

Further, the present disclosure may realize the laundry treating apparatus capable of both cleaning the heat-exchanger and discharging water discharged from air passing through the heat-exchanger, using a single pump.

In addition to the effects as described above, specific effects of the present disclosure will be described together with the detailed description for carrying out the disclosure.

DETAILED DESCRIPTION

Figure 1:
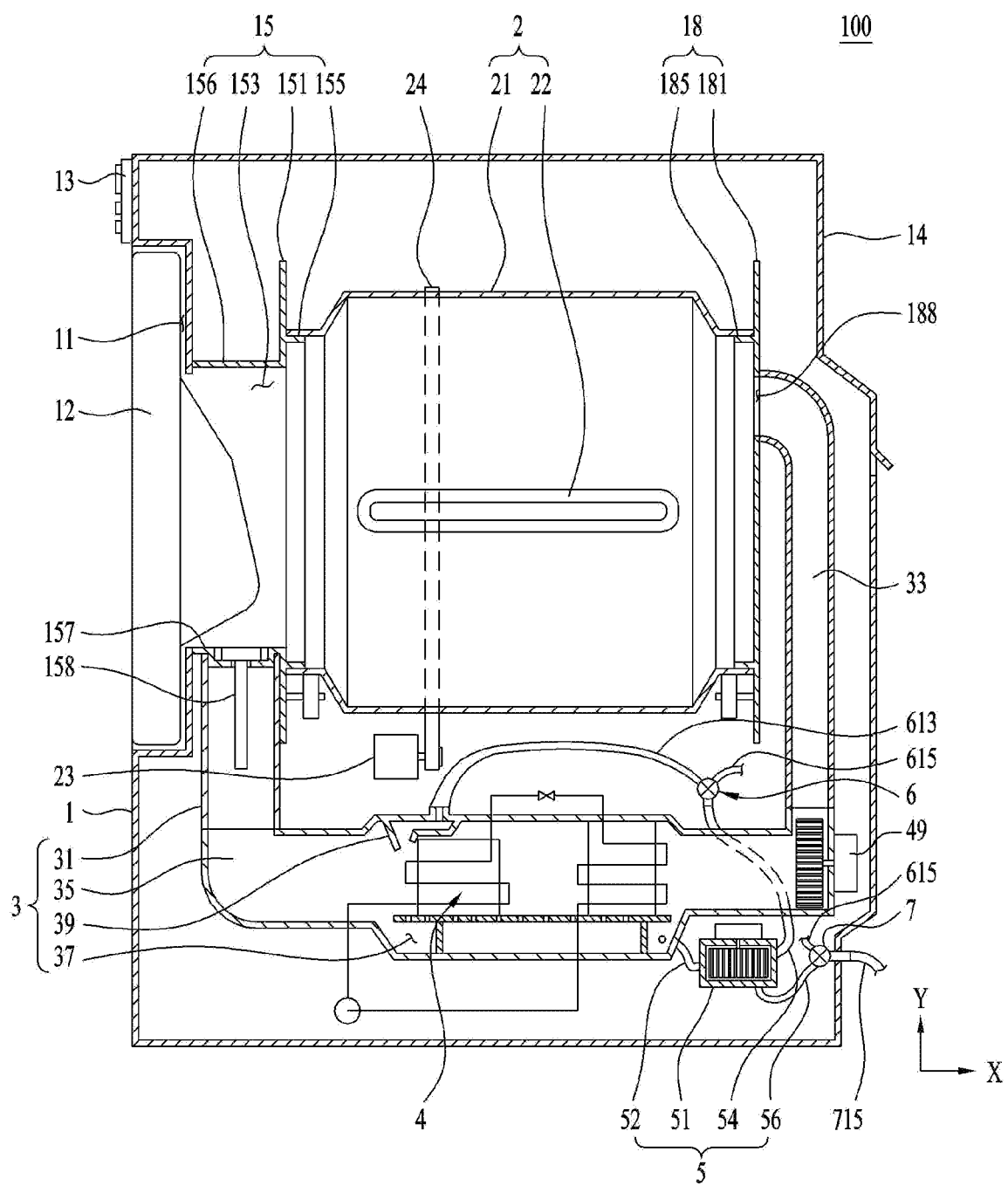
FIG. 1 shows an example of a laundry treating apparatus.

For simplicity and clarity of illustration, elements in the figures are not necessarily drawn to scale. The same reference numbers in different figures denote the same or similar elements, and as such perform similar functionality. Furthermore, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 shows an example of a laundry treating apparatus 100,

The laundry treating apparatus 100 includes a cabinet 1, a drum 2 that is rotatably disposed inside the cabinet to provide a space for storing laundry therein, a duct 3 that defines a water flow path that resupplies air exhausted from the drum 2 back to the drum 2, and a heat-exchanger 4 that dehumidifies and heats the air introduced into the duct 3 and then resupplies the heated air to the drum 2.

The cabinet 1 may be configured to include a front panel defining a front face of the laundry treating apparatus, a rear panel 14 defining a rear face of the laundry treating apparatus, and a top panel defining a top face of the laundry treating apparatus.

The front panel has an inlet 11 defined therein communicating with the drum 2. The inlet 11 may be constructed to be opened and closed by a door 12 pivotally coupled to the cabinet.

A control panel 13 is disposed on the front panel. The control panel 13 may include an input unit for receiving a control command from a user, and a display for outputting information such as and a control command selectable by the user. The input unit may be configured to include a power supply request unit for requesting power supply to the laundry treating apparatus, a course input unit for allowing a user to select a desired course among a plurality of courses, and an execution request unit for requesting start of a course selected by the user.

When the drum 2 is embodied as a cylindrical drum body 21 with open front and rear faces, a first support 15 supporting the front face of the drum 2 so as to rotate, and a second support 18 supporting the rear face of the drum 2 so as to rotate may be disposed inside the cabinet 1, The first support 15 may be configured to include a first fixed body 151 fixedly disposed inside the cabinet 1, a drum inlet 153 constructed to extend through the first fixed body 151 and communicating the inlet 11 and the inside of the drum body 21 with each other, and a first support body 155 disposed on the first fixed body 151 and inserted into the front face of the drum body 21.

The first fixed body 151 may have any shape as long as the drum inlet 153 may be defined therein and the first support body 155 may be disposed thereon. The first support body 155 may be formed in a pipe shape protruding from the first fixed body 151 toward the drum body 21. A diameter of the first support body 155 may be larger than a diameter of the drum inlet 15 and may be smaller than a front face diameter of the drum body 21. In this case, the drum inlet 153 may be located inside a space defined by the first support body 155.

The first support 15 may be constructed to be connected to the inlet 11 through the connection body 156. The connection body 156 may be formed in a cylindrical shape surrounding the inlet 11. In this case, the drum inlet 153 may be embodied as a through-hole passing through the connection body 156 and connected to the inlet 11.

Figure 2:
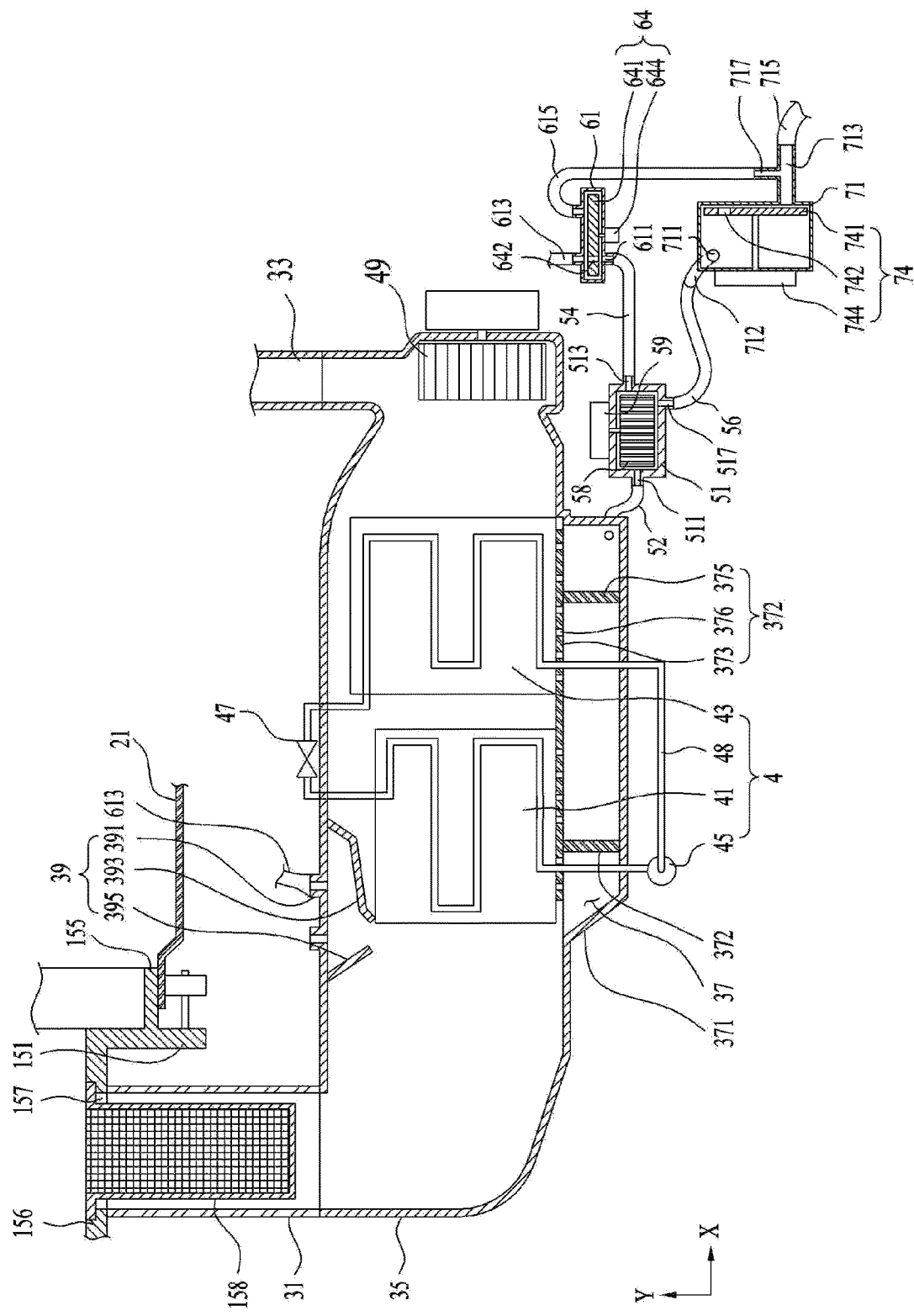
FIGS. 2 to 3B show examples of a duct, a heat-exchanger, a pump, a water flow-path switch, and a water flow-path controller.

The connection body 156 may have an air discharge hole 157 defined therein that communicates with the duct 3. As shown in FIG. 2, the air discharge hole 157 may be embodied as a through-hole constructed to extend through the connection body 157. The air inside the drum body 21 may flow to the duct 3 through the air discharge hole 157.

As shown in FIG. 1, the second support 18 may include a second fixed body 181 fixedly disposed inside the cabinet 1, and a second support body 185 disposed on the second fixed body 181 and inserted into the rear face of the drum body 21. An air inlet 188 is defined in the second support 18 and extends through the second fixed body 181 and communicates the inside of the drum body 21 with the inside of the cabinet 1. In this case, the duct 3 may be constructed to connect the air discharge hole 157 and the air inlet 188 to each other.

The drum body 21 may be formed in a hollow cylindrical shape. A lifter 22 for stirring the laundry may be disposed on the circumferential face of the drum body 21. The lifter 22 may be embodied as a board protruding from the circumferential surface of the drum body 21 toward a center of rotation of the drum body.

The drum body 21 may be rotated by a drum driver. The drum driver may be configured to include a motor 23 fixedly disposed inside the cabinet 1, a pulley rotated by the motor, and a belt 24 connecting the circumferential surface of the pulley and the circumferential surface of the drum body 21 with each other.

The duct 3 may be configured to include an air discharge duct 31 connected to the air discharge hole 157, an air supply duct 33 connected to the air inlet 188, and a connection duct 35 connecting the air discharge duct and the air supply duct to each other.

The heat-exchanger 4 may be embodied as various devices as long as the devices may sequentially perform dehumidification and heating of the air introduced into the duct 3. FIG. 1 shows an example in which the heat-exchanger is embodied as a heat pump.

As shown in FIG. 2, the heat-exchanger 4 includes a fan 49 that moves air along the duct 3, a first heat-exchanger (heat-absorber) 41, and a second heat-exchanger (heat-emitter) 43 which is disposed inside the duct 3 and heats the air that has passed through the first heat-exchanger 41.

The heat-absorber 41 is embodied as a plurality of metal plates arranged along a width direction of the connection duct 35 or a Z-axis direction or a plurality of metal plates arranged along a height direction of the connection duct or a X-axis direction. The heat-emitter 43 may be embodied as a plurality of metal plates arranged along a width direction of the connection duct or a height direction of the connection duct. The heat-absorber 41 and the heat-emitter 43 are sequentially arranged along an air movement direction, and are connected to each other via the refrigerant pipe 48 which defines a refrigerant circulation path.

The refrigerant moves along a refrigerant pipe 48 by a compressor 45 located outside the duct 3. The refrigerant pipe 48 is equipped with a pressure regulator 47 that controls a pressure of the refrigerant that has passed through the heat-emitter 43.

The heat-absorber 41 may refer to means for cooling the air and evaporating the refrigerant by transferring the heat of the air flowing into the air discharge duct 31 to the refrigerant. The heat-emitter 43 may refer to means for heating the air and condensing the refrigerant by transferring the heat of the refrigerant passing through the compressor 45 to the air. In this case, moisture contained in the air may be collected on a bottom face of the connection duct 35 along a surface of the heat-absorber 41 as the air passes through the heat-absorber 41.

A water collector is disposed in the laundry treating apparatus 100 to collect the water removed from the air passing through the heat-absorber 41. The water collector 37 may be disposed anywhere inside the laundry treating apparatus as long as the collector may store therein water discharged from the heat-absorber. FIG. 2 shows an example where the water collector 37 is located inside the connection duct 35.

The water collector 37 may be embodied as a collector body 371 which is fixed to the bottom face of the connection duct 35 and communicates with the inside of the connection duct. To prevent the heat-absorber and the heat-emitter 41 and 43 from contacting the water (condensate) stored in the collector body 371, a heat-exchanger support 372 may be further disposed inside the collector body 371. The heat-exchanger support 372 may include a support plate 373 which the heat-absorber and the heat-emitter 41 and 43 contact, a spacer 375 that maintains a spacing between the support plate 373 and the bottom face of the collector body 371, and a support plate through-hole 376 constructed to pass through the support plate 373.

The support plate through-hole 376 may be defined only in a portion of the support plate 373 on which the heat-absorber 41 is supported, or may be defined in portions thereof on which the heat-absorber is supported and the heat-emitter is supported, respectively. When the support plate through-hole 376 is defined under the heat-emitter 43, water that has moved to the heat-emitter 43 along the support plate 373 may be discharged to the collector body 371 (thus, preventing decrease in heat transfer efficiency that occurs when the heat-emitter contacts the water).

In order to minimize accumulation of foreign matters (lint) discharged from the drum body 21 on the heat-absorber 41 and the heat-emitter 43, a filter 158 for filtering air may be further disposed in the laundry treating apparatus 100. The filter 158 is detachably disposed in the air discharge hole 157 and may be constructed to filter air flowing into the air discharge duct 31.

In one example, the foreign matter of a size smaller than a size of foreign matter which the filter 158 blocks may remain on the heat-absorber 41. To clean the foreign substances remaining on the heat-absorber, the laundry treating apparatus 100 include an water ejector 39 that supplies water to the heat-absorber 41, and a pump 5 that supplies water inside the collector body 371 to the water ejector.

The water ejector 39 includes a duct through-hole 391 constructed to extend through a top face of the connection duct 35, and a first guide 393 that guides water supplied to the duct through-hole to the front face of the heat-absorber 41.

When the pressure of the water supplied to the duct through-hole 391 is high, water flowing into the duct through-hole 391 may not be supplied to the front face of the heat-absorber 41 and may be ejected into the connection duct 35. In order to solve such a problem, the water ejector 39 may be constructed to further include a second guide 395 inclined downward from a top face of the connection duct 35 toward the front face of the heat-absorber 41. Therefore, at least a portion of the water that has passed through the first guide 393 may be supplied to the front face of the heat-absorber 41 via the second guide 395.

The pump 5 may include a pump housing 51 that provides a space for storing water therein, a first connection pipe 52 that guides the water inside the collector body 371 to the pump housing 51, and a second connection pipe 54 to guide the water inside the pump housing 51 to the water ejector 39.

Inside the pump housing 51, an impeller 58 rotated by an impeller driver 59 is disposed. A pump inlet 511 to which the first connection pipe 52 is connected, and a first pump discharge hole 513 to which the second connection pipe 54 is connected may be defined in the circumferential face of the pump housing 51. Therefore, when the impeller 58 rotates, the water stored in the collector body 371 moves to the pump housing 51 through the first connection pipe 52 and the pump inlet 511. The water inside the pump housing may be transferred to the duct through-hole 391 of the water ejector through the first pump discharge hole 513 and the second connection pipe 54.

In the pump 5 having the above structure, the impeller 58 must be rotatable inside the pump housing 51. Thus, a bottom of the impeller 58 and the bottom face of the pump housing 51 must be kept spaced from each other. Therefore, there is a problem that water that cannot be discharged using the impeller remains on the bottom face of the pump housing 51.

In order to solve the above-described problem, a water flow-path controller 7 for discharging water (remaining water) remaining in the pump housing 51 may be further disposed in the laundry treating apparatus 100.

The water flow-path controller 7 may refer to means for draining the remaining water inside the pump housing 51 to the outside of the cabinet. The water flow-path controller may be constructed to include a controller housing 71 constructed to communicate with the pump housing 51. The controller housing 71 may include a chamber that provides a space for storing water therein, a controller inlet 711 and a controller discharge hole that extend through the controller housing 71 to communicate the chamber with the outside, a water supply pipe 712 connected to the controller inlet 711, and a water discharge pipe 713 connected to the controller discharge hole.

A water discharge hose 715 is connected to the water discharge pipe 713. The water discharge hose 715 may refer to means to guide the water discharged to the water discharge pipe to the outside of the cabinet 1. The water discharge hose 715 may be constructed to connect the water discharge pipe 713 to a sewer.

The water supply pipe 712 is connected to the pump housing 51 through a third connection pipe 56. A discharge hole 517 (second pump discharge hole) may extend through a bottom face of the pump housing 51. The third connection pipe 56 may be constructed to connect the second pump discharge hole 517 and the water supply pipe 712 to each other.

Since the controller housing 71 is positioned below the pump housing 51, the remaining water inside the pump housing 51 may be supplied to the controller housing 71 through the third supply pipe 56.

A valve 74 is further disposed inside the controller housing to control opening and closing of the water discharge pipe 713 in order to control the timing of discharge of remaining water inside the pump housing 51. The valve 74 may be constructed to include a valve body 741 pivotally disposed inside the controller housing, a valve body through-hole 742 constructed to extend through the valve body 741, and a valve body driver 744 for rotating the valve body.

The valve body 741 may be formed in a shape that divides an inner space of the controller housing 71 into a space communicating with the water supply pipe 712 and a space communicating with the water discharge pipe 713. FIG. 2 shows an example where the valve body 741 is embodied as a disk-shaped board.

The valve body through-hole 742 is defined in a position where the water discharge pipe 713 may be opened according to a pivoting angle of the valve body 741. When the valve body 741 rotates to a position where the valve body through-hole 742 opens the water discharge pipe 713, the water inside the pump housing 51 will be discharged to the water discharge hose 715 through the controller housing 71. However, when the valve body through-hole 742 is rotated to close the water discharge pipe 713, the water inside the pump housing 51 will be prevented from being discharged to the water discharge hose 715.

Figure 4:
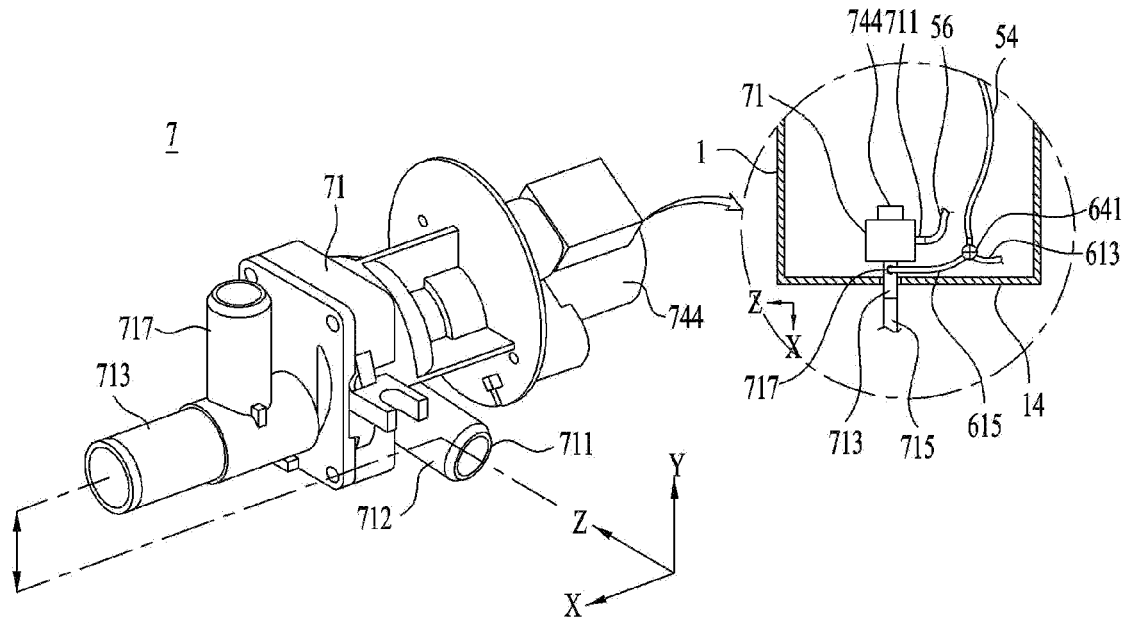
FIGS. 4 and 5 show another embodiment of a water flow-path controller.
Figure 5:
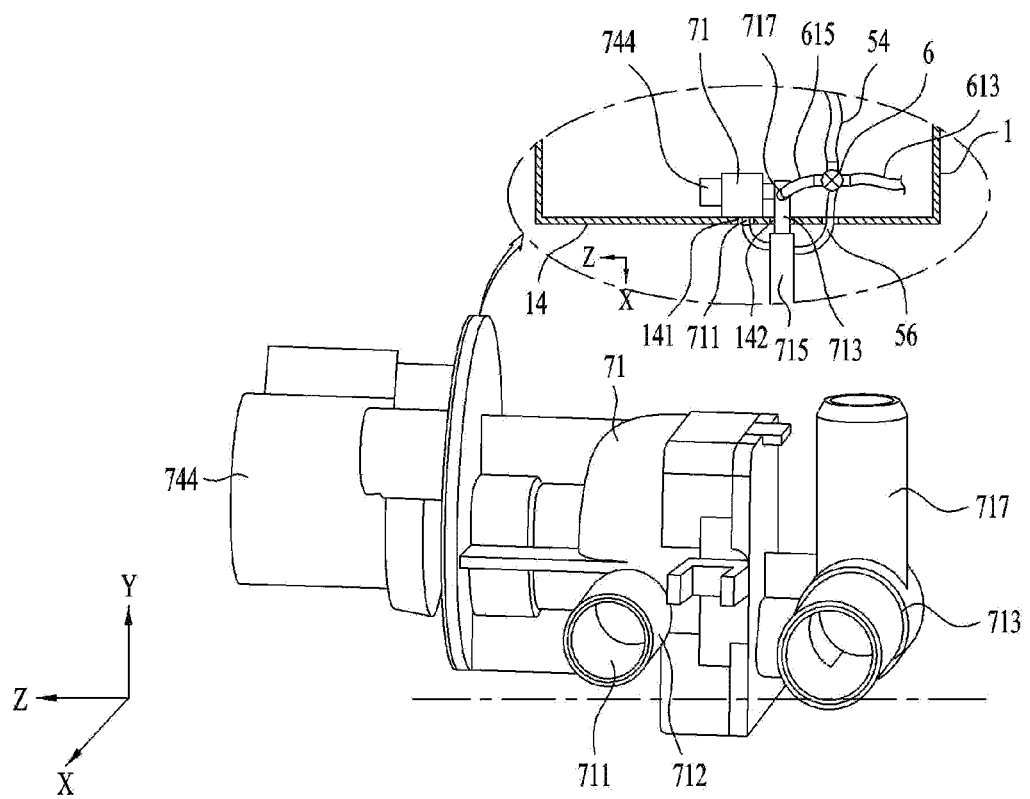

It is preferable that a bottom of the water discharge pipe 713 be positioned at a lower level than a level of a bottom of the water supply pipe 712 so that the water flowing into the controller housing 71 may be discharged to the water discharge pipe 713 without separate means (See FIG. 4 and FIG. 5). Although not shown in the drawings, the water discharge pipe 713 may be constructed to be inclined downward along a direction away from the controller housing 71.

In one example, as shown in FIG. 2, the laundry treating apparatus 100 may further include a water flow-path switch 6 which supplies water discharged from the pump housing 51 through the second connection pipe 54 to the water ejector 39 or to the water discharge pipe 713.

The water flow-path switch 6 may include a switch housing 61 that provides a space for storing water therein, a switch inlet 611 that introduces water supplied from the second connection pipe 54 into the switch housing 61, a first switch discharge hole and a second switch discharge hole through which water inside the switch housing 61 is discharged, and a switch valve 64 that is pivotally disposed inside the switch housing 61 and selectively opens the first switch discharge hole and the second switch discharge hole.

The first switch discharge hole may be connected to the duct through-hole 391 of the water ejector through the water ejector supply pipe 613. The second switch discharge hole may be connected to the water discharge pipe 713 through water discharger supply pipe 615.

The switch valve 64 selectively opens the first switch discharge hole and the second switch discharge hole as follows. When the first switch discharge hole is opened, the second switch discharge hole is closed. When the first switch discharge hole is closed, the second switch discharge hole is open.

The switch valve 64 is constructed to include a switch body 641 which is pivotally disposed inside the switch housing 51, a switch body through-hole 642 which is constructed to extend through the switch body to selectively open the water ejector supply pipe and the discharger supply pipe according to the pivoting angle of the switch body, and a switch body driver 644 that rotates the switch body 641.

The switch body 641 may be embodied as a disk that divides the inside of the switch housing 61 into a space communicating with the switch inlet and a space communicating with the water ejector supply pipe and the discharger supply pipe.

The water discharger supply pipe 615 may be connected to, at one end thereof, to the second switch discharge hole. The other end of the pipe 615 may be constructed to be connected to the communication pipe 717 disposed in the water discharge pipe 713.

As shown in FIG. 2, when the switch body 641 is rotated to open only the water ejector supply pipe 613, the valve body 641 may pivot to a position at which the water discharger supply pipe 615 is closed. When the impeller 58 rotates in this state, the water from the collector body 371 will be supplied to the water ejector 39, so the laundry treating apparatus 100 may clean the heat-absorber 41.

Figure 3A:
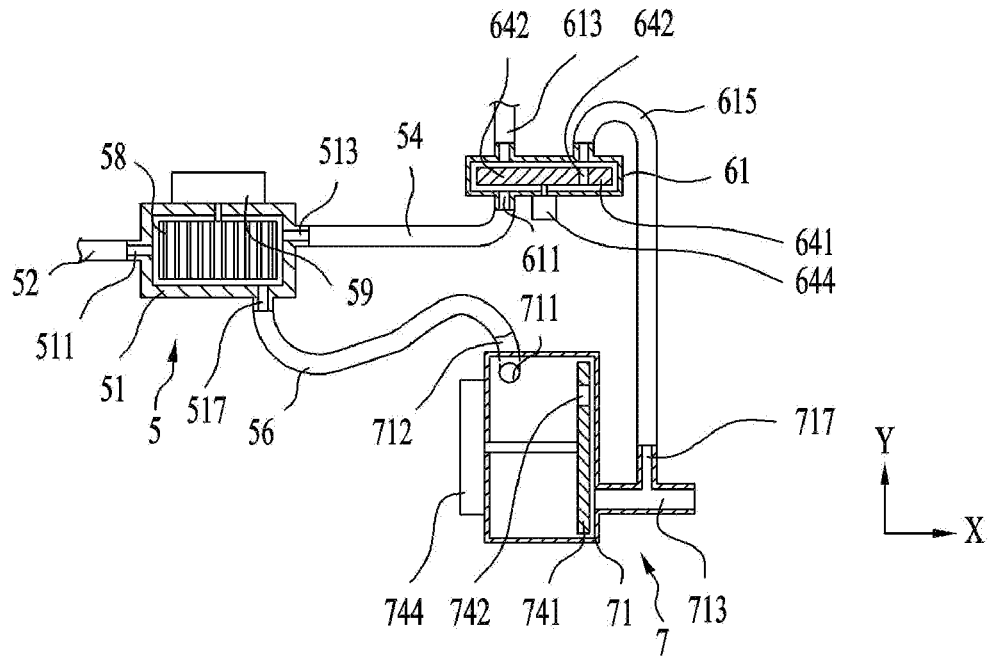

As shown in FIG. 3A, when the switch body 641 is rotated to open only the water discharger supply pipe 615, the valve body 641 may pivot to a position at which the water ejector supply pipe 613 is closed. When the impeller 58 rotates in this state, the water from the collector body 371 will be discharged to the outside of cabinet 1 through the communication pipe 717, the water discharge pipe 713, and the hose 715.

Figure 3B:
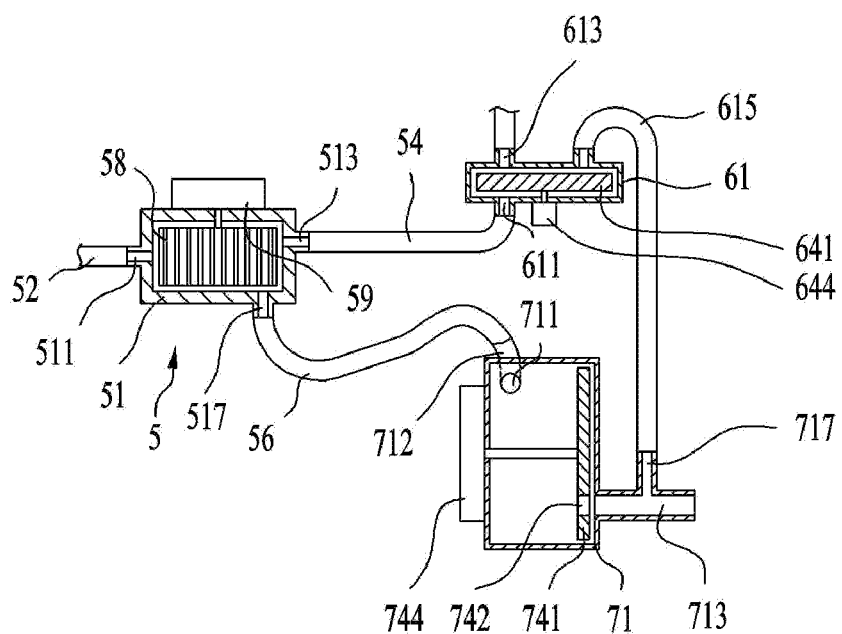

In another example, as shown in FIG. 3B, when the operation of the heat-exchanger 4 and the rotation of the impeller 58 are finished, the valve body driver 744 may allow the body 741 to pivot such that an open state of the water discharge pipe 713 may be maintained. This is intended to drain the water remaining in the pump housing 51 to the outside of the cabinet after the operations of the heat-exchanger 4 and the pump 5 are completed. In the case of FIG. 3B, the switch body 641 may pivot to a position such that both the water ejector supply pipe 613 and the water discharger supply pipe 615 are closed, or may pivot such that one of the two supply pipes 613 and 615 is open.

As shown in FIG. 4, a first through-hole into which the water discharge pipe 713 is inserted may be defined in the rear face 14 of the cabinet. In this case, a communication pipe 717 may be located inside the cabinet 1. The communication pipe 717 may extend in a perpendicular manner to the water discharge pipe 717 along a Y-axis direction, that is, the height direction of the cabinet 1.

FIG. 5 shows a case where a first through-hole 141 into which the water discharge pipe 713 is inserted and a second through-hole 412 into which the water supply pipe 712 is inserted are defined in the rear face 14 of the cabinet. The water discharge pipe 713 and the water supply pipe 712 may extend in parallel to each other. In this case, it is preferable that a bottom of the water discharge pipe 713 is located at a level lower than a level of a bottom of the water supply pipe 713.

The communication pipe 717 may be constructed to be perpendicular to the water discharge pipe 713 along the Y-axis direction, that is, the height direction of the cabinet, but may be located inside the cabinet 1. When the communication pipe 717 extend in a perpendicular to the water discharge pipe 713, it is possible to minimize the residual water in the water discharger supply pipe 615.

The laundry treating apparatus and the control method of the laundry treating apparatus as above-described may be modified and implemented in various forms, and the scope of the disclosure is not limited to the above-described embodiments.

What is claimed is:

1. A laundry treating apparatus comprising:
   a cabinet;
   a drum that is located inside the cabinet and that defines a space to receive laundry;
   a duct system including:
      an air discharge duct configured to discharge air from inside of the drum to an outside of the drum,
      an air supply duct configured to supply air to the drum, and
      a connection duct configured to connect the air discharge duct and the air supply duct to each other;
   a fan configured to move air along the duct system;
   a heat-exchanger including:
      a heat-absorber that is located inside the connection duct and that is configured to remove moisture from air within the connection duct, and
      a heat-emitter that is located inside the connection duct and that is configured to heat air passing through the heat-absorber;
   a water collector configured to store water removed from air passing through the heat-absorber;
   a water ejector that is located in the duct system and that defines a water flow path that supplies water to the heat-absorber to remove foreign substances remaining on the heat-absorber;
   a water flow-path controller including:
      a controller housing that defines a space to store water,
      a water discharge pipe configured to discharge water from the space of the controller housing to an outside of the laundry treating apparatus, and
      a valve configured to control opening and closing of the water discharge pipe; and
   a pump including:
      a pump housing that defines a space to store water,
      a first connection pipe configured to guide water from the water collector to the pump housing,
      a second connection pipe configured to guide water from the space of the pump housing to the water ejector,
      a third connection pipe that is separate from the second connection pipe and that is configured to guide water from the space of the pump housing to the water flow-path controller,
      an impeller that is located inside the pump housing and that is configured to rotate, and
      an impeller driver configured to rotate the impeller.

2. The apparatus of claim 1, further comprising a discharge hole that extends through a bottom face of the pump housing, wherein an end of the third connection pipe is connected to the discharge hole.

3. The apparatus of claim 1, wherein the valve includes:
   a valve body that is located inside the controller housing and that divides the space of the controller housing into (i) a first space that communicates with the third connection pipe and (ii) a second space that communicates with the water discharge pipe;
   a valve body through-hole that extends through the valve body and that enables water to flow to the water discharge pipe, the valve body being configured to open or close the valve body through-hole based on a pivoting angle of the valve body; and
   a valve body driver configured to activate a pivoting motion of the valve body to open or close the valve body through-hole.

4. The apparatus of claim 1, further comprising a water flow-path switch that includes:
   a switch housing that defines a space to store water;
   a switch inlet configured to introduce water supplied from the pump through the second connection pipe into the switch housing;
   a water ejector supply pipe configured to guide water from inside the switch housing to the water ejector;
   a discharger supply pipe configured to guide water from inside the switch housing to the water discharge pipe; and
   a switch valve configured to control opening and closing of the water ejector supply pipe and opening and closing of the discharger supply pipe.

5. The apparatus of claim 4, wherein the switch valve includes:
   a switch body that is located inside the switch housing and that divides a space of the switch housing into a first space that communicates with the switch inlet and a second space that communicates with the water ejector supply pipe and the discharger supply pipe;
   a switch body through-hole that extends through the switch body and that enables water to flow to the water ejector supply pipe and the discharger supply pipe, the switch body being configured to open or close the switch body through-hole based on a pivoting angle of the switch body; and a switch body driver configured to activate a pivoting motion of the switch body to open or close the switch body through-hole.

6. The apparatus of claim 5, wherein a bottom end of the water discharge pipe is positioned at a level lower than a level of a bottom end of the third connection pipe.

7. The apparatus of claim 5, wherein the water discharge pipe is inclined downwards as the water discharge pipe extends in a direction away from the controller housing.

8. The apparatus of claim 5, wherein the controller housing is positioned at a lower level than a level of the pump housing.

9. The apparatus of claim 8, further comprising:
a first through-hole that extends through a rear face of the cabinet, wherein the water discharge pipe is inserted into the first through-hole; and
a communication pipe that is located at the water discharge pipe, wherein the discharger supply pipe is connected to the communication pipe,
wherein the communication pipe is located inside the cabinet and is oriented perpendicular to the water discharge pipe along a height direction of the cabinet.

10. The apparatus of claim 8, further comprising:
a first through-hole that extends through a rear face of the cabinet, wherein the water discharge pipe is inserted into the first through-hole; and
a second through-hole that extends through the rear face of the cabinet, wherein the water flow-path controller further comprises a water supply pipe that is connected to the third connection pipe and that is configured to guide water into the controller housing, the water supply pipe being inserted into the second through-hole; and
a communication pipe that is located at the water discharge pipe, wherein the discharger supply pipe is connected to the communication pipe,
wherein the communication pipe is located inside the cabinet and is oriented perpendicular to the water supply pipe along a height direction of the cabinet.

11. The apparatus of claim 10, wherein the water discharge pipe and the water supply pipe are oriented parallel to each other.

12. The apparatus of claim 5, wherein the valve includes:
a valve body that is located inside the controller housing;
a valve body through-hole that extends through the valve body and that enables water to flow to the water discharge pipe, the valve body being configured to open or close the valve body through-hole based on a pivoting angle of the valve body; and
a valve body driver configured to activate a pivoting motion of the valve body to open or close the valve body through-hole, and
wherein the valve body driver is configured to, based on the switch body pivoting to open the water ejector supply pipe and close the discharger supply pipe, activate a pivoting motion of the valve body to close the water discharge pipe.

13. The apparatus of claim 12, wherein the valve body driver is configured to, based on the switch body pivoting to close the water ejector supply pipe and open the discharger supply pipe, activate a pivoting motion of the valve body to close the water discharge pipe.

14. The apparatus of claim 13, wherein the valve body driver is configured to, based on termination of operation of the heat-exchanger and the impeller driver, activate a pivoting motion of the valve body to open the water discharge pipe.

15. The apparatus of claim 8, wherein the water flow-path controller further comprises a water supply pipe connected to the third connection pipe and configured to guide water into the controller housing.

16. The apparatus of claim 1, wherein the third connection pipe is disposed at a position of the pump housing below the impeller, and
wherein the second connection pipe is disposed above the third connection pipe.

17. A laundry treating apparatus comprising:
a cabinet;
a drum that is located inside the cabinet and that defines a space to receive laundry;
a duct system including:
an air discharge duct configured to discharge air from inside of the drum to an outside of the drum,
an air supply duct configured to supply air to the drum, and
a connection duct configured to connect the air discharge duct and the air supply duct to each other;
a fan configured to move air along the duct system;
a heat-exchanger including:
a heat-absorber that is located inside the connection duct and that is configured to remove moisture from air within the connection duct, and
a heat-emitter that is located inside the connection duct and that is configured to heat air passing through the heat-absorber;
a water collector configured to store water removed from air passing through the heat-absorber;
a water ejector that is located in the duct system and that defines a water flow path that supplies water to the heat-absorber to remove foreign substances remaining on the heat-absorber;
a pump configured to selectively guide water from the water collector to the water ejector or to discharge water from the water collector to outside of the laundry treating apparatus;
a water discharge pipe connected fluidly to the pump to discharge water from the water collector to outside of the laundry treating apparatus; and
a water flow-path controller fluidly connected to the pump and the water discharge pipe and configured to discharge water from the water collector to an outside of the laundry treating apparatus, the water flow-path controller including a controller housing that defines a space to store water, and a valve configured to control opening and closing of the water discharge pipe,
wherein the water ejector includes a water flow-path switch that is connected to the water flow path of the water ejector and the water discharge pipe and that is configured to selectively guide water from the pump to the heat-absorber or to discharge water in the pump to the outside of the laundry treating apparatus, and
wherein the pump includes:
a pump housing that defines a space to store water,
a first connection pipe configured to guide water from inside the water collector to the pump housing,
an impeller that is located inside the pump housing and that is configured to rotate,
an impeller driver configured to rotate the impeller,
a second connection pipe connected to the water flow-path switch and configured to guide water from inside the pump housing to the pump housing, and a third connection pipe that is separate from the second connection pipe and that is configured to guide water from the pump housing to a water supply pipe of the water flow-path controller.

18. The apparatus of claim 17, wherein the third connection pipe is disposed at a position of the pump housing below the impeller, and wherein the second connection pipe is disposed above the third connection pipe.

19. A laundry treating apparatus comprising:
a cabinet;
a drum that is located inside the cabinet and that defines a space to receive laundry;
a duct system including:
  an air discharge duct configured to discharge air from inside of the drum to an outside of the drum,
  an air supply duct configured to supply air to the drum, and
  a connection duct configured to connect the air discharge duct and the air supply duct to each other;
a fan configured to move air along the duct system;
a heat-exchanger including:
  a heat-absorber that is located inside the connection duct and that is configured to remove moisture from air within the connection duct, and
  a heat-emitter that is located inside the connection duct and that is configured to heat air passing through the heat-absorber;
a water collector configured to store water removed from air passing through the heat-absorber;
a water ejector that is located in the duct system and that defines a water flow path that supplies water to the heat-absorber to remove foreign substances remaining on the heat-absorber;
a water flow-path controller including:
  a controller housing that defines a space to store water,
  a water supply pipe configured to supply water into the controller housing,
  a water discharge pipe configured to discharge water from inside the controller housing, and
  a valve configured to control opening and closing of the water discharge pipe; and
a pump including:
  a pump housing that defines a space to store water,
  a first connection pipe configured to guide water from inside the water collector to the pump housing,
  a second connection pipe configured to guide water from inside the pump housing to the water ejector,
  a third connection pipe configured to guide water from inside the pump housing to the water supply pipe,
  an impeller that is located inside the pump housing and that is configured to rotate, and
  an impeller driver configured to rotate the impeller,
wherein the valve includes:
  a valve body that is located inside the controller housing and that divides a space of the controller housing into a first space that communicates with the water supply pipe and a second space that communicates with the water discharge pipe,
  a valve body through-hole that extends through the valve body and that enables water to flow to the water discharge pipe, the valve body being configured to open or close the valve body through-hole based on a pivoting angle of the valve body, and
  a valve body driver configured to activate a pivoting motion of the valve body to open or close the valve body through-hole.

20. The apparatus of claim 19, further comprising a water flow-path switch that includes:
a switch housing that defines a space to store water;
a switch inlet configured to introduce water supplied from the second connection pipe into the switch housing;
a water ejector supply pipe configured to guide water from inside the switch housing to the water ejector,
a discharger supply pipe configured to guide water from inside the switch housing to the water discharge pipe; and
a switch valve configured to control opening and closing of the water ejector supply pipe and opening and closing of the discharger supply pipe.

* * * * *